United States Patent
Rope et al.

(10) Patent No.: US 10,769,161 B2
(45) Date of Patent: *Sep. 8, 2020

(54) GENERATING BUSINESS INTELLIGENCE ANALYTICS DATA VISUALIZATIONS WITH GENOMICALLY DEFINED GENETIC SELECTION

(71) Applicant: International Business Machines Corporation, Armonk, NY (US)

(72) Inventors: Daniel J. Rope, Reston, VA (US); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 661 days.

This patent is subject to a terminal disclaimer.

(21) Appl. No.: 14/931,537

(22) Filed: Nov. 3, 2015

(65) Prior Publication Data

US 2017/0124455 A1    May 4, 2017

(51) Int. Cl.
| | |
|---|---|
| *G06F 16/248* | (2019.01) |
| *G06N 3/12* | (2006.01) |
| *G06Q 10/06* | (2012.01) |
| *G06F 16/904* | (2019.01) |
| *G06F 16/901* | (2019.01) |

(52) U.S. Cl.
CPC ......... *G06F 16/248* (2019.01); *G06F 16/904* (2019.01); *G06F 16/9024* (2019.01); *G06N 3/126* (2013.01); *G06Q 10/06* (2013.01)

(58) Field of Classification Search
CPC .......... G06F 17/5009; G06F 17/30958; G06F 17/30994; G06N 3/126; G06Q 10/06
See application file for complete search history.

(56) References Cited

U.S. PATENT DOCUMENTS

| | | | |
|---|---|---|---|
| 7,366,719 B2 | 4/2008 | Shaw | |
| 8,117,139 B2 | 2/2012 | Bonabeau et al. | |
| 8,838,510 B2 | 9/2014 | Baughman et al. | |
| 9,311,383 B1* | 4/2016 | Karty | G06F 17/30595 |

(Continued)

OTHER PUBLICATIONS

Forbus, Tristin, "Using Evolutionary Algorithms to Generate Multi-view Visualization Layouts," PhD diss., University of Oklahoma, 2012, 96 pages. (Year: 2012).*

(Continued)

*Primary Examiner* — Kamran Afshar
*Assistant Examiner* — Ying Yu Chen
(74) *Attorney, Agent, or Firm* — John Noh

(57) ABSTRACT

Techniques are described for genomically defining digital genes encoding data visualization elements and potential incremental changes to the elements as the basis for a genetic selection process for automated generating of data visualizations. In one aspect, a method includes receiving set of input data. The method further includes generating digital genes that genomically define data visualization elements based on the input data, and that define potential incremental changes to the data visualization elements. The method further includes executing a genetic selection process with respect to one or more fitness functions on populations of candidate data visualizations that are based on the genomically defined data visualization elements. The method further includes outputting final data visualization output generated by the genetic selection process.

20 Claims, 7 Drawing Sheets

(56) References Cited

U.S. PATENT DOCUMENTS

| | | | | |
|---|---|---|---|---|
| 2005/0261953 A1* | 11/2005 | Malek | ............... | G06Q 30/02 |
| | | | | 705/7.32 |
| 2013/0132042 A1* | 5/2013 | Chan | ............... | G06F 17/50 |
| | | | | 703/1 |
| 2017/0185658 A1 | 6/2017 | Rope | | |

OTHER PUBLICATIONS

Aydemir, E. & Koruca, H. I., "A New Production Scheduling Module Using Priority-Rule Based Genetic Algorithm", Sep. 2015, Int j simul model 14 (2015) 3, p. 450-462. (Year: 2015).*

Benjamin Bach, Andre Spritzer, Evelyne Lutton, and Jean-Daniel Fekete, "Interactive Random Graph Generation with Evolutionary Algorithms", 2013, In: Didimo W., Patrignani M. (eds) Graph Drawing. GD 2012. Lecture Notes in Computer Science, vol. 7704. Springer, Berlin, Heidelberg, pp. 541-552. (Year: 2013).*

X. H. Shi, L. M. Wan, H. P. Lee, X. W. Yang, L. M. Wang, Y. C. Liang, "An Improved Genetic Algorithm With Variable Population Size and a PSO-GA Based Hybrid Evolutionary Algorithm", 2003, Proceedings of the Second International Conference on Machine Learning and Cybernetics, Xi'an, pp. 1735-1740. (Year: 2003).*

Babak Sohrabi, Payam Mahmoudian, and Iman Raeesi, "A framework for improving e-commerce websites usability using a hybrid genetic algorithm and neural network system", Jul. 8, 2011, Neural Comput & Applic (2012) 21, pp. 1017-1029. (Year: 2011).*

List of patents treated as related, Appendix P, 2 pgs.

Forbus, Tristin, "Using Evolutionary Algorithms to Generate Multi-view Visualization Layouts," PhD diss., University of Oklahoma, 2012, 96 pages.

Farooq, Humera et al., "An Interactive Visualization of Genetic Algorithm on 2-D graph," 2011 10th IEEE International Conference on Cognitive Informatics & Cognitive Computing (ICCI CC), pp. 144-151, IEEE, 2011.

Hart, Emma et al., "GAVEL—a New Tool for Genetic Algorithm Visualization," IEEE Transactions on Evolutionary Computation 5, No. 4, 2001, pp. 335-348.

Office Action from US. Appl. No. 15/460,664, dated Jul. 9, 2019, 25 pp.

Amendment in Response to Office Action dated Jul. 9, 2019, from U.S. Appl. No. 15/460,664, filed Jul. 23, 2019, 9 pp.

Shi et al., "An Improved Genetic Algorithm With Variable Population-Size and a PSO-GA Based Hybrid Evolutionary Algorithm", Proceedings of the Second International conference on Machine Learing and Cyberetics, Xi'an, Nov. 2-5, 2003, pp. 1-6.

* cited by examiner

GENERATING BUSINESS INTELLIGENCE ANALYTICS DATA VISUALIZATIONS WITH GENOMICALLY DEFINED GENETIC SELECTION

TECHNICAL FIELD

This disclosure relates to business intelligence systems, and more particularly, to business intelligence and predictive analytics systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may include analytics systems that may provide insights into collections of enterprise data. An analytics system may be used to explore data, determine cause and effect relationships among data, formulate predictions based on existing data, and support decision-making, for example. An analytics system may also use predictive analytics for generating data forecasts. An analytics system may include a variety of tools and capabilities for analyzing and exploring data.

SUMMARY

In one aspect of the invention, a method includes receiving, with one or more processing devices, a set of input data. The method further includes generating, with the one or more processing devices, digital genes that genomically define data visualization elements based on the input data, and that define potential incremental changes to the data visualization elements. The method further includes executing, with the one or more processing devices, a genetic selection process with respect to one or more fitness functions on populations of candidate data visualizations that are based on the genomically defined data visualization elements. The method further includes outputting, with the one or more processing devices, a final data visualization output generated by the genetic selection process.

In another aspect, a computer program product includes a computer-readable storage medium having program code embodied therewith. The program code is executable by a computing device to receive a set of input data. The program code is further executable by a computing device to generate digital genes that genomically define data visualization elements based on the input data, and that define potential incremental changes to the data visualization elements. The program code is further executable by a computing device to execute a genetic selection process with respect to one or more fitness functions on populations of candidate data visualizations that are based on the genomically defined data visualization elements. The program code is further executable by a computing device to output a final data visualization output generated by the genetic selection process.

In another aspect, a computer system includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to receive a set of input data. The computer system further includes program instructions, stored on at least one of the one or more storage devices for execution by at least one of the one or more processors via at least one of the one or more memories, to generate digital genes that genomically define data visualization elements based on the input data, and that define potential incremental changes to the data visualization elements. The computer system further includes program instructions, stored on at least one of the one or more storage devices for execution by at least one of the one or more processors via at least one of the one or more memories, to execute a genetic selection process with respect to one or more fitness functions on populations of candidate data visualizations that are based on the genomically defined data visualization elements. The computer system further includes program instructions, stored on at least one of the one or more storage devices for execution by at least one of the one or more processors via at least one of the one or more memories, to output a final data visualization output generated by the genetic selection process.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for applying and using genomic definitions of data visualization elements for genetic algorithms to automatically generate data visualizations. The genomic definitions of a system of this disclosure specify incremental, iterative changes to data visualization elements. The genomic definitions may be combined in chromosomes that define combinations of incremental, iterative actions to change to data visualization elements. A data visualization genomic system of this disclosure may then execute genetic algorithms to evolve data visualization element candidates based on chromosomes containing genes defining the iterative changes, in accordance with specified fitness functions, thereby enabling efficient and effective genetic algorithm evolution of data visualizations.

Previously, data visualizations might be generated using a set of expert system rules manually created and coded by visualization professionals, in accordance with specification details defined by business users to be appropriate to a particular business data domain. Instead, a data visualization genomic system of this disclosure may perform automated generation of data visualizations using genetic algorithms with a defined fitness function and chromosomes assembled with digital genes, where each digitally encoded gene corresponds to a defined, coherent action to incrementally modify an element of a data visualization.

A data visualization genomic system of this disclosure may execute evolution of potentially large numbers of generations of potentially large populations of candidate data visualizations specified by genomically defined incremental changes, and subjected to specified fitness functions. The genetic algorithms may include repeated generational cycles of interbreeding, mutations, and down-selection in subjection to the fitness function, in each generation. A data visualization genomic system of this disclosure may thereby generate final data visualizations with superior traits relative to the specified fitness functions, such as to graphically depict potentially large amounts of potentially complex data in visualizations that facilitate intuitive grasp of and insight into the data. In various examples, implementations of this disclosure may thus enable effective and efficient genetic algorithm implementations for generating data visualizations, such as Business Intelligence (BI) analytics data and predictive analytics data. This may include automated generation of data visualizations that provide insights into data without burdening business users with first having to figure out details of how to specify a data visualization for a set of data. A data visualization genomic system of this disclosure may be particularly well-suited for facilitating open exploration of novel, non-routine, or unfamiliar datasets, for which customary data visualization formats have not yet been defined.

Figure 1:
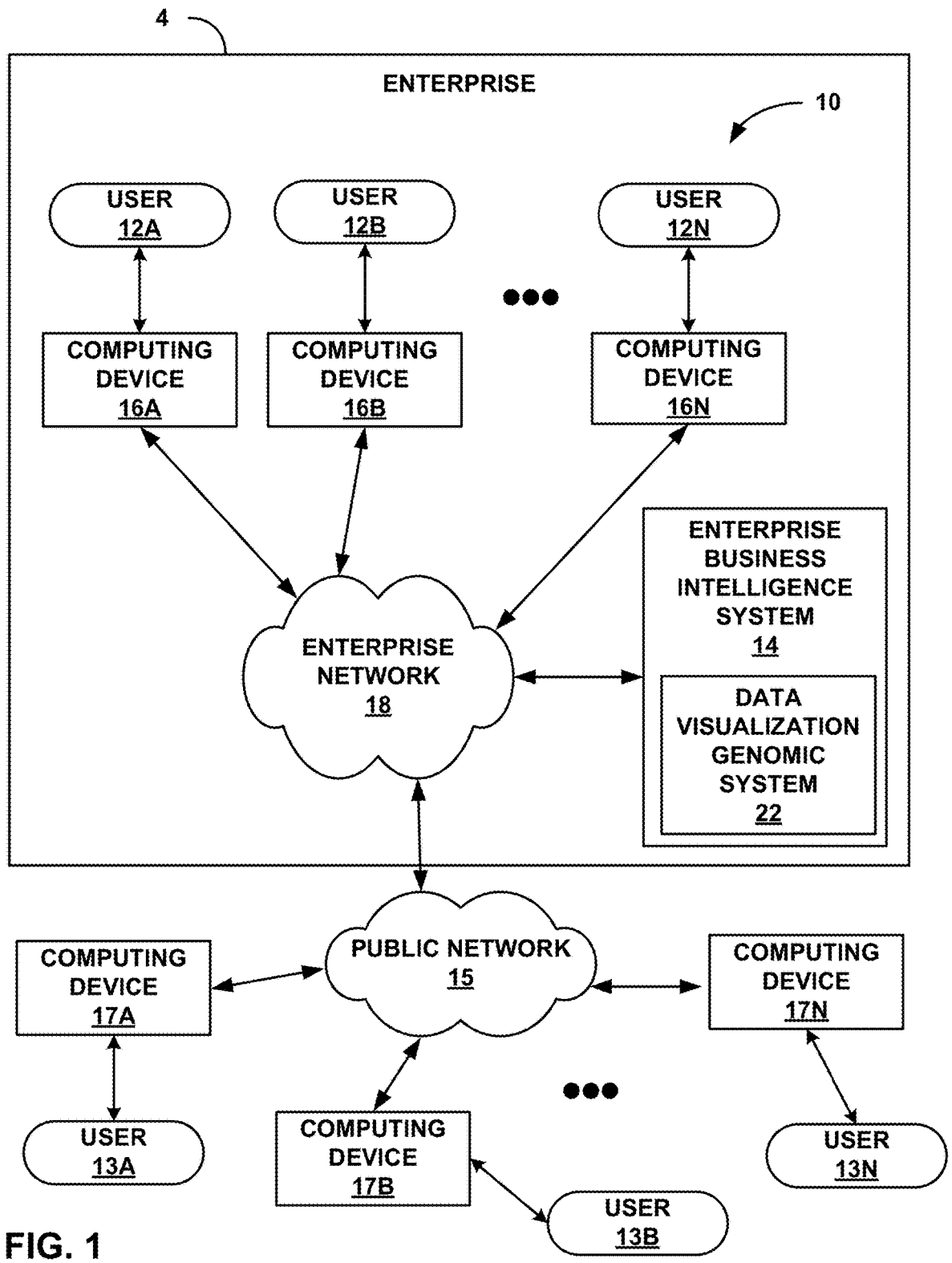
FIG. 1 shows a block diagram illustrating an example enterprise software system that may apply genomic definitions of data visualization elements for generating data visualization elements with genetic algorithms, in one aspect of this disclosure.

FIG. 1 shows a block diagram illustrating an example enterprise software system 4 that may apply genomic definitions of data visualization elements for generating data visualization elements with genetic algorithms, in one aspect of this disclosure. FIG. 1 illustrates an example context in which a data visualization genomic system 22 of this disclosure may be used. Data visualization genomic system 22 may receive a set of data, apply genomic definitions to a body of specified actions that cause incremental changes to data visualization elements, and execute genetic algorithms on populations of candidate data visualization elements in accordance with the genomic definitions, thereby ultimately generating a data visualization output that may be highly well-suited in accordance with specified fitness functions, as further described below. FIG. 1 is a block diagram illustrating an example enterprise 4 having a computing environment 10 in which a plurality of users 12A-12N within enterprise 4 (collectively, "enterprise users 12" or "users 12") may interact with an enterprise business intelligence (BI) system 14 that includes a data visualization genomic system 22, as described further below.

In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15, including external client computing devices 17A-17N (collectively, "external client computing devices 17" or "computing devices 17") used by external users 13A-13N ("external users 13"). Enterprise 4 may thus make data visualization genomic system 22 available to any of enterprise users 12 and/or external users 13.

Users 12, 13 may use a variety of different types of computing devices 16, 17 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14. An external user 13 may also access data visualization genomic system 22 via a smartphone, tablet computer, or similar device, running a business intelligence dashboard in a web browser, a dedicated mobile application, or other means for interacting with certain externally surfaced functions of enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
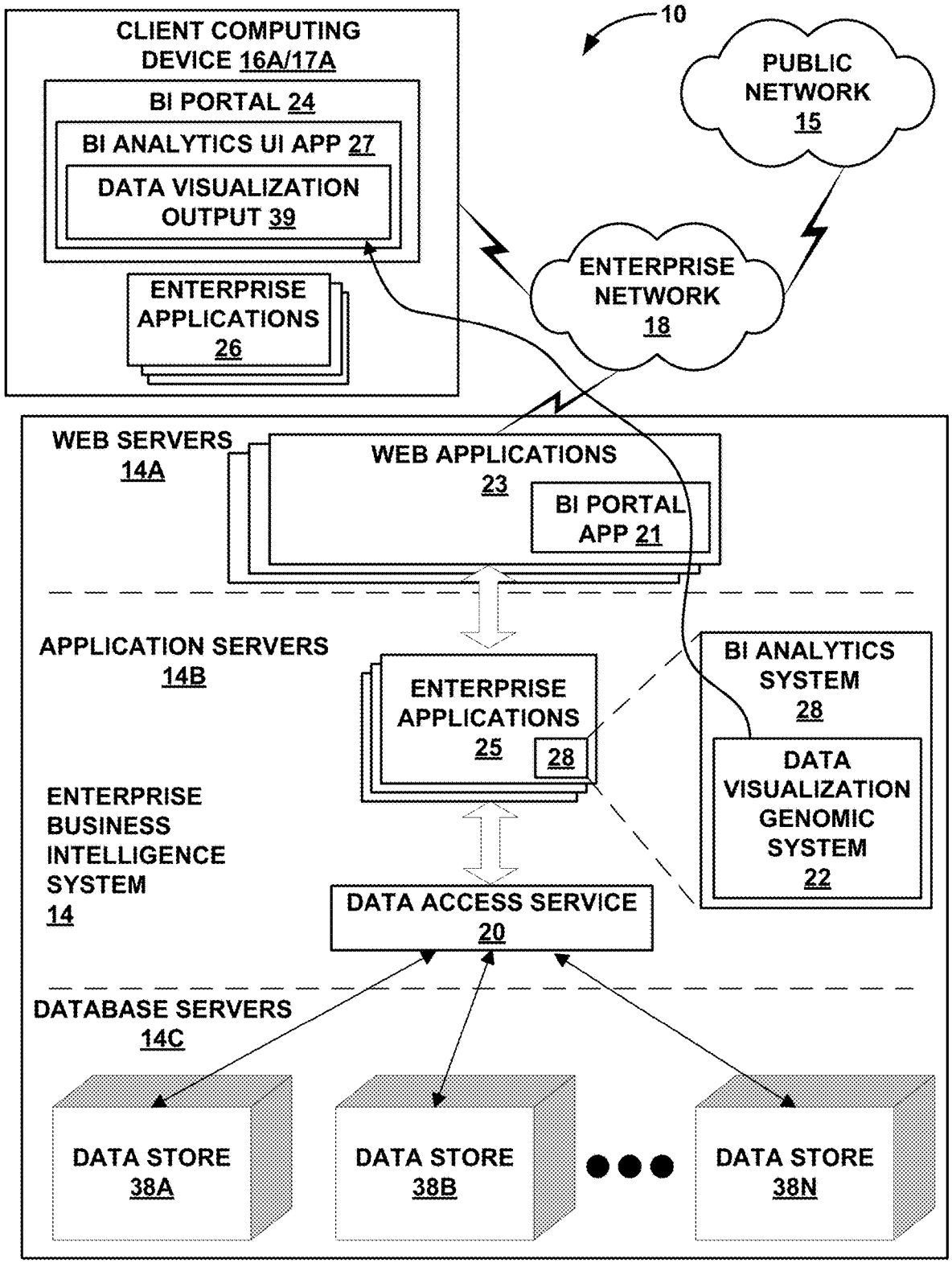
FIG. 2 shows a conceptual block diagram illustrating in further detail portions of one embodiment of enterprise business intelligence (BI) computing environment that includes a BI analytics system including data visualization genomic system as part of an enterprise BI computing system, in one aspect of this disclosure.

FIG. 2 shows a conceptual block diagram illustrating in further detail portions of one embodiment of enterprise business intelligence (BI) computing environment 10 that includes a BI analytics system 28 including data visualization genomic system 22 as part of an enterprise BI computing system 14, in one aspect of this disclosure. In this example implementation, a single client computing device 16A is shown for purposes of example and includes a BI portal 24 and one or more client-side enterprise software applications 26 that may utilize and manipulate data, including to view analytics tools and data visualizations with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may include a user interface for a BI analytics application user interface (UI) 27 that may interact with a BI analytics system 28 that comprises data visualization genomic system 22. BI analytics system 28 configured with data visualization genomic system 22 may receive a set of data, apply genomic definitions to a body of specified actions that cause incremental changes to data visualization elements, and execute genetic algorithms on populations of candidate data visualization elements in accordance with the genomic definitions, thereby ultimately generating a data visualization output that may be highly well-suited in accordance with specified fitness functions, as further described below. Data visualization genomic system 22 may thereby enable BI analytics system 28 and/or BI analytics application UI 27 to generate finalized genomic-system-generated data visualization output 64, as further described below.

BI portal 24 may output the finalized genomic-system-generated data visualization output 64 for a user to view, manipulate, and explore. BI portal 24 may present finalized genomic-system-generated data visualization output 64 in the form of charts or graphs that a user may view, manipulate, and explore, for example. BI portal 24 may present finalized genomic-system-generated data visualization output 64 based on data from sources such as BI reports, e.g., that may be generated with enterprise business intelligence system 14, or another BI dashboard, as well as other types of data sourced from external resources through public network 15. BI portal 24 may present finalized genomic-system-generated data visualization output 64 based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide finalized genomic-system-generated data visualization output 64 that represents, provides data from, or links to any of a variety of types of resource, such as BI reports, software applications, databases, spreadsheets, data structures, flat files, Extensible Markup Language ("XML") data, comma separated values (CSV) files, data streams, unorganized text or data, or any other type of files or resources. BI portal 24 may provide finalized genomic-system-generated data visualization output 64 generated by data visualization genomic system 22 to enable any type of data to be analyzed and explored via user inputs and/or using tools for analyzing and exploring data, for example.

Data visualization genomic system 22 may be hosted among enterprise applications 25, as in the example depicted in FIG. 2, or may be hosted elsewhere, including on a client computing device 16A/17A (which may be a client computing device 16A internal to enterprise computing environment 10 or a client computing device 17A external to enterprise computing environment 10 in different examples), or distributed among various computing resources in enterprise business intelligence system 14, in some examples. Data visualization genomic system 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include data visualization genomic system 22 as one of enterprise software applications 25 or as a portion or portions of one or more of enterprise software applications 25.

The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Data sources 38 may also include one or more sets of cross sectional data, for example.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. Data access service 20 may also return this result set to data visualization genomic system 22 to process in accordance with genomic incremental change action definitions and specified fitness functions to generate finalized data visualization output 64, which BI analytics system 28 may then provide to BI portal 24 or other enterprise applications 26, potentially incorporated into BI reports or other BI objects.

As described above and further below, data visualization genomic system 22 may be implemented in one or more computing devices, and may involve one or more applications or other software modules that may be executed on one or more processors. Example embodiments of the present disclosure may illustratively be described in terms of the example of data visualization genomic system 22 in various examples described below.

Figure 3:
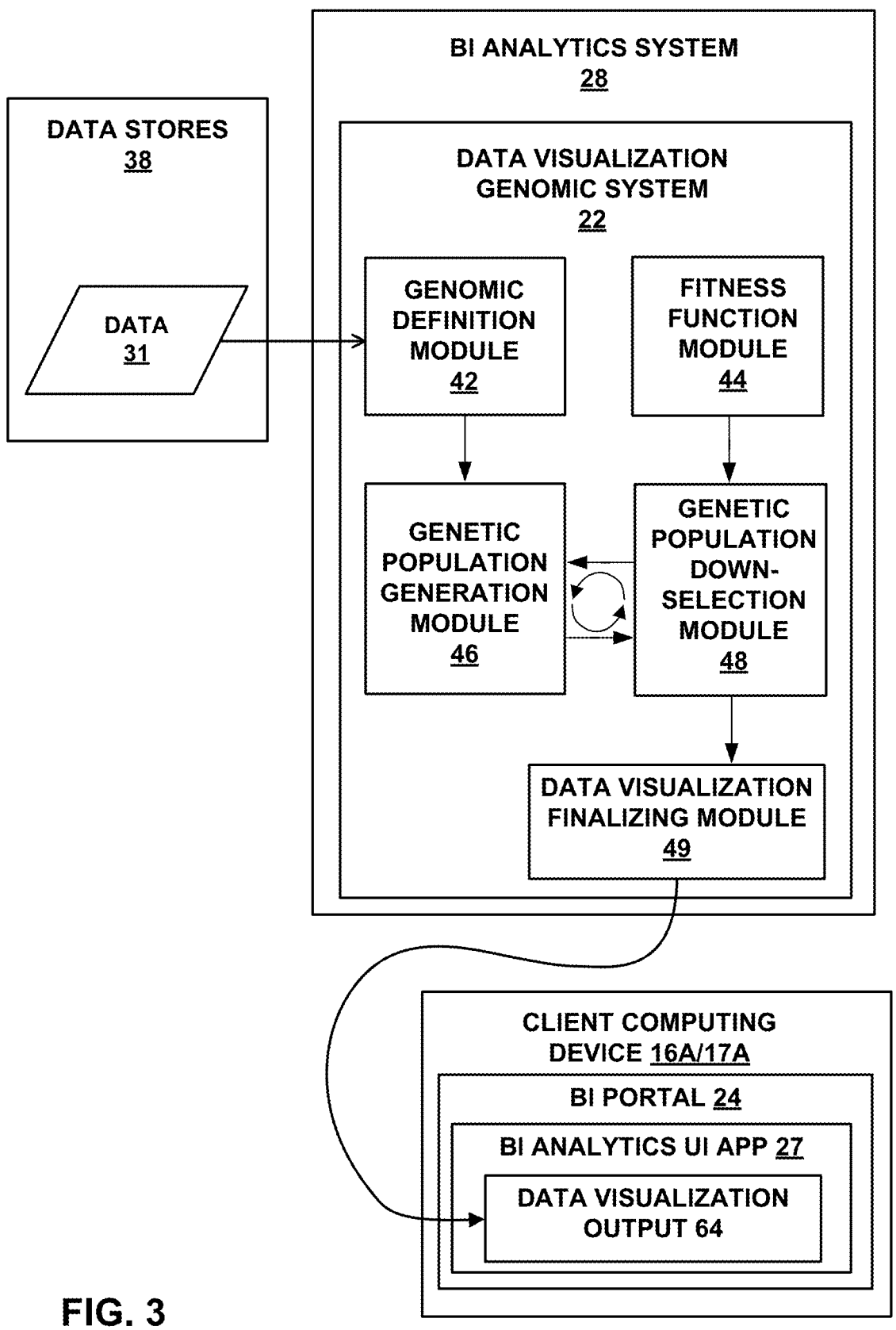
FIG. 3 shows a conceptual block diagram of a data visualization genomic system configured to perform a data visualization genomic process, in one aspect of this disclosure.

FIG. 3 shows a conceptual block diagram of a data visualization genomic system 22 configured to perform a data visualization genomic process, in one aspect of this disclosure. Data visualization genomic system 22 is incorporated in BI analytics system 28, and receives specified input data set 31 from data stores 38, such as in response to a query or set of queries. Data visualization genomic system 22 may include or be conceptualized in terms of a number of discrete modules, units, subsystems, or portions, including a genomic definition module 42, a fitness function module 44, a genetic population generation module 46, a genetic population down-selection module 48, and a data visualization finalizing module 49, in this example.

Data visualization genomic system 22 first processes the incoming data set 31 with genomic definition module 42, as further described below. In brief, genomic definition module 42 may generate a potentially large number of data visualization elements representing the input data set 31, and may assign a potentially large number of genomically defined candidate incremental changes to the data visualization elements representing the input data set 31. The data visualization elements may include various types of charts or graphs; various sizes, colors, orientations, coordinate systems, or other aspects of chart or graph features; various techniques or schemes for grouping, partitioning, or stacking the data; or other types of data visualization elements, as further described below. The genomically defined candidate incremental changes to the data visualization elements may include specific, individual, incremental or atomic potential changes, or "actions," to each of the data visualization elements, as further described below. Genomic definition module 42 may then pass the data visualization elements and genomically defined candidate incremental changes, incorporating the data from the input data set 31, to genetic population generation module 46.

Genetic population generation module 46 may generate a potentially large population of candidate data visualizations for the input data set 31 based on the data visualization elements and the genomically defined candidate incremental potential changes incorporating the data from input data set 31. This may include genetic population generation module 46 combining the data visualization elements into large numbers of combinations, where each combination may be a complete candidate data visualization of the data. Genetic population generation module 46 may generate tens, thousands, millions, billions, or potentially any number of candidate data visualizations, depending on implementation details of specified robustness and processing burden, where each candidate data visualization combines various candidate data visualization elements. Genetic population generation module 46 may then pass the population of candidate data visualizations to genetic population down-selection module 48.

Genetic population down-selection module 48 may access one or more fitness functions from fitness function module 44. The one or more fitness functions determine fitness criteria that codify design goals for the final output form of the data visualizations, such as specific criteria to make the data visualizations facilitate rapid comprehension and insight into the data. Genetic population down-selection module 48 subjects the population of candidate data visualizations received from genetic population generation module 46 to survival review with respect to the one or more fitness functions. Genetic population down-selection module 48 selects only a portion of the population of candidate data visualizations to survive, those that are more fit relative to the one or more fitness functions, and rejects the remainder. This may be referred to as down-selecting the population of candidate data visualizations to a down-selected subset that are relatively higher-performing with respect to the one or more fitness functions. Genetic population down-selection module 48 may also use some degree of variation in how it tests the various candidate data visualizations with respect to the fitness functions.

Genetic population down-selection module 48 may then pass the down-selected portion of candidate data visualizations back to genetic population generation module 46, which may use the down-selected candidate data visualizations as the base material for a new generation of candidate data visualizations, using the incremental change actions in the data visualization elements. Genetic population generation module 46 may generate several new candidate data visualizations based on each of several individual candidate data visualizations or pairs or groups of candidate data visualizations from the down-selected portion of the older population. Genetic population generation module 46 may generate several new candidate data visualizations based on an individual older candidate data visualization by iteratively randomly applying one or more incremental candidate change actions to perform in one or more of the data visualization elements from the older candidate data visualization.

Genetic population generation module 46 may also select and mix and match data visualization elements from two or more of the data visualization elements from the older candidate data visualization, potentially in combination with randomly applying one or more incremental candidate change actions in one or more of the data visualization elements, to generate new candidate data visualizations that inherit the same or action-modified traits or data visualization elements from two or more progenitor data visualizations from the older, down-selected population portion. Genetic population generation module 46 may thus generate a new population of candidate data visualizations that proliferates the genomically defined incremental change actions in the phase space of possible data visualizations proximate to the successful survivor data visualizations from the previous generation. Genetic population generation module 46 may then pass its new generation of candidate data visualizations to genetic population down-selection module 48.

Genetic population down-selection module 48 may then repeat, with this new population, the process of down-selecting the received population of candidate data visualizations in tests of performance with respect to the fitness functions. The new incoming population of candidate data visualizations is superior to the previous generation in meeting the goals of the fitness functions, and the new down-selection process results in a newly down-selected population that is yet higher-performing with respect to the fitness functions. Genetic population down-selection module 48 may subsequently pass its newly down-selected population culled from the new population of candidate data visualizations to genetic population generation module 46. Genetic population generation module 46 and genetic population down-selection module 48 may repeat this cycle of population proliferation and down-selection any number of times, from few to many, depending on specified goals and processing time.

After, e.g., a specified number of cycles are complete or one or more specified stopping criteria are met, genetic population down-selection module 48 may pass a final down-selected population to data visualization finalizing module 49. In some examples, data visualization finalizing module 49 may monitor the results of genetic population down-selection module 48, and may determine when to stop the population cycling between genetic population generation module 46 and genetic population down-selection module 48, and/or determine when to indicate to genetic population down-selection module 48 to output resulting data visualizations to data visualization finalizing module 49.

Data visualization finalizing module 49 may select a single data visualization from the last down-selected population from genetic population down-selection module 48 as a final output of data visualization genomic system 22. Data visualization finalizing module 49 may select the data visualization to be outputted as the data visualization that is highest performing relative to the fitness functions from among the final down-selected population. In some examples, genetic population down-selection module 48 may down-select the final population down to a single, highest-performing individual data visualization, and may output that single data visualization to data visualization finalizing module 49. While data visualization genomic system 22 is described above in terms of the respective modules, in other examples, the described functions may be distributed or implemented in any analogous arrangement in data visualization genomic system 22.

When genomic definition module 42 receives data set 31, genomic definition module 42 may identify the types, formats, and/or properties of all the data, and associate the data with corresponding genomically defined candidate data visualization elements with associated genomically defined incremental change actions. For example, genomic definition module 42 may identify bodies of data in data set 31 in the form of or organized into spreadsheets, tables, columns, databases, OLAP data cubes, other data stores, or other types or formats of data. Genomic definition module 42 may then variously assign each spreadsheet, table, column, database or database portion, OLAP data cube or cube portion, other data store or data store portion, or other body of data in other format, into various forms of data visualization elements and combinations of data visualization elements in various candidate data visualizations. Each of the data visualization elements may carry its associated genomically defined potential incremental changes in its genes, where the genes are genomically defined potential incremental changes to the data visualization elements, as further described below.

The action genes assigned by genomic definition module 42 may define actions to make incremental changes in one aspect in data visualization elements, such as charts, for example. The incremental changes may be to change axes, colors, nestings of one chart element in another, or chart types, for example. Genetic population generation module 46 may combine data visualization elements and their incremental change action genes in a potentially large variety of charts or other data visualizations. The incremental potential change action genes may be collected in "chromosomes" that coherently described a logically associated set of potential incremental changes to the associated data visualization. Genetic population generation module 46 may "breed" new candidate data visualizations using combinations of genes from the input candidate data visualizations initially from genomic definition module 42 and subsequently from genetic population down-selection module 48. The data visualization elements with their associated genes may enable large amounts, e.g., millions, billions, etc., of potential combinations of data visualization elements into complete data visualizations.

Genetic population generation module 46 may also introduce a certain number (e.g., a relatively small number compared to the total number of genes) of amount of random mutations into the genes in each generation, in some examples. The random mutations may include new modes or aspects of incrementally changing the data visualizations, that are not inherited from the genes in the input data visualization elements received by genetic population generation module 46, and may be completely different than the genes from the input data visualization elements. Many of the random mutations may be harmful with respect to the fitness functions and may be likely to get selected out of the next generation by genetic population down-selection module 48, but some random mutations may introduce new, highly scoring aspects with respect to the fitness functions.

Genetic population down-selection module 48 may evaluate the candidate data visualization population it receives from genetic population generation module 46 and may score each candidate data visualization with respect to how well it performs with respect to the fitness functions. Each new generation of candidate data visualizations after the first generation may largely be formed of variations and recombinations and results of good breeding from the previous one or more generations, along with occasional new material introduced by random mutations. Thus, each generation of candidate data visualizations may be likely to score more highly on average with respect to the fitness functions than the previous generation. In some examples, genetic population down-selection module 48 may also include some element of randomness in its scoring with respect to the fitness functions, such as by selecting only certain randomly selected portions of a particular candidate data visualization to evaluate with respect to the fitness functions on a given evaluation, or applying only a subset of one or more fitness functions on a given scoring evaluation of a candidate data visualization. Such use of partial evaluations and/or admixture of randomness may encourage more substantial variation to be propagated between the generations and prevent a potential overly rapid reduction in variation in the population in some examples (depending also on other factors such as population size of the candidate data visualization populations, complexity of the candidate data visualization genomes defining the candidate incremental change action genes, and complexity of the fitness functions).

The applicable data visualization elements may be associated with a grammar-based visualization system. A visualization grammar definition system may encode a graphic structure and orthogonality that may encapsulate specific aspects that define a visualization and differentiate each visualization from others. A visualization grammar definition system by itself could potentially define incremental candidate changes to data visualization elements, but on such a fine-grained scale that randomly selecting incremental changes in the visualization grammar would render negligible or incoherent changes in most cases. In contrast, the incremental change action genes applied by data visualization genomic system 22 define incremental candidate changes that are meaningful and coherent. The incremental change action genes applied by data visualization genomic system 22 may be thought of or analyzed in terms of groups of subsets of visualization grammar enabled atomic changes that exclude negligible and incoherent candidate incremental changes to data visualization elements. The incremental change action genes applied by data visualization genomic system 22 may thus provide the basis for enabling efficient evolution of populations of candidate data visualizations, by providing an underlying mechanism wherein each gene encodes a meaningful and coherent potential change to an element of a data visualization, leading to final selection of an optimally evolved data visualization.

Data visualization genomic system 22 may thus execute a genetic selection process that includes iteratively generating populations of candidate data visualizations and down-selecting from among the populations with respect to the one or more fitness functions stored in or provided by fitness function module 44. The generating of the populations of candidate data visualizations by genetic population generation module 46 may be based on combinations of the genes initially as generated by genomic definition module 42 and subsequently based on new combinations of the genes from the down-selected populations resulting from the down-selection processes performed by genetic population down-selection module 48.

A genomic action, or incremental change action gene, may encode and cause an incremental change or atomic change to at least one element of a data visualization. A genomic action may be associated with a triplet of characteristics (A, F, N), where A, F, and N may be defined as follows:

A is a descriptor that defines the main purpose of the action. It is the "name" of the action, and defines what the action will do. A basic implementation might have this as a simple name, or it could also have meta-information that adds classification information to the name. The actions may have string descriptors that encapsulate both the name of an action and a hierarchy on those actions.

F may define a single field, which is a reference to a data field. Some actions may use this field to map data to graphic properties in the corresponding data visualization element. In addition to the standard data field, a genomic action may also include special fields, Index (which may index a row) and Count (which may be initially one for each row, but may be re-defined by aggregation). Specific metadata regarding the field may also be used to distinguish the action. This may enable a candidate evaluation procedure such as implemented by genetic population down-selection module 48 to distinguish, for example, whether the action was applied to a field with various specific numbers of categories (e.g., three categories or 300).

N may be a simple integer number or a limited integer-indexed option index from a limited domain. It may be used by genomic actions to vary the behavior of the action defined by a gene, or to index among a limited domain of potential variations. For example, the domain of N may be the numbers {0, 1, 2, 3, 4, 5}. In some examples, the domain N may encode a specific domain such as a boolean operator (which may be equivalent to a two-integer option index), a limited set of options for a visualization element, an indication of a type, or an indication of a particular field such as a statistic or a percentage.

Thus, one or more of the genes may include descriptors A that define actions to modify the data visualization elements; data fields F enabled to map data from the input data to graphic properties in data visualization elements defined by the genes; and a limited option index N indicating one of a limited set of options associated with a particular type of variation in one of the potential incremental changes to the data visualization elements.

Once the actions are defined, a digital "chromosome" for a given visualization may then be defined by genomic definition module 42 as the sequence of genomic actions, potentially indicating the presence and full description or the absence of each potential genomic action. The chromosome then completely defines a resulting candidate data visualization which may then be evaluated for survival within a genetic algorithm, e.g., by genomic definition module 42, by any selected genetic algorithm techniques, and in subjection to any selected one or more fitness functions. Thus, genomic definition module 42 may generate digital chromosomes comprising organized sets of the digital genes sufficient to genomically define complete sets of the data visualization elements to compose the candidate data visualizations.

Illustrative examples of values for genomic actions including a Descriptor, a Field, and a Number are presented below in Table 1:

TABLE 1

Example candidate change action genes for data visualization property changes

| Descriptor | Field | Number | Description |
|---|---|---|---|
| SetType | — | type | Set the data visualization element to have a given type {e.g., point, interval, line; path, area; polygon} |
| Coordinate | F | — | Add the field as coordinate, e.g., first Y, then X, then Z |
| Panel | F | boolean | Add the field as a faceting. Number indicates if it is horizontal or vertical |

TABLE 1-continued

Example candidate change action genes for data visualization property changes

| Descriptor | Field | Number | Description |
|---|---|---|---|
| Size | F | W/H/B | Add a size aesthetic to a given element. Number may describe if it affects width, height, or both |
| Color | F | F/O/B | Add a color aesthetic to the given element. Number may describe if it affects fill, outline, or both |
| Polar | — | boolean | Set polar coordinates. Boolean may indicate, e.g., to go clockwise from top or counterclockwise from right |
| Stack | — | — | Stack the elements |
| Dodge | — | — | Dodges the element |
| Geographic | — | — | Indicates that the coordinates are geographic references |
| Layout.Bubble | — | — | Use a bubble layout |
| Layout.Graph | F | type | Use a graph layout (type differentiates between basic tree, treemap, dag, etc.) |
| Aggregate.Aggregate | — | — | Aggregates data. By default everything may be a grouping field, so we see all unique combinations |
| Aggregate.Group | F | L/M/H | States that this field needs transforming into few, medium, or many groups - binning for numeric data |
| Aggregate.SetCount | F | — | This field, when aggregated, is used as the count field |
| Aggregate.Summarize | F | statistic | When aggregating, this field is a summary field |

Thus, one or more of the genes may determine a type of data visualization element with which to represent a portion of data from the input data, such as points, intervals, lines, paths, areas, polygons, or combinations thereof, for example. One or more of the genes may determine a coordinate system with which to represent a portion of data from the input data, such as Cartesian (e.g., X, Y, or X, Y, Z), plane polar, three-dimensional polar cylindrical, or three-dimensional spherical, for example. One or more of the genes may determine a shape with which to represent a portion of data from the input data, such as circles, squares, bars, lines, or crosses, for example. One or more of the genes may determine a color with which to represent a portion of data from the input data. One or more of the genes may determine a type of layout with which to represent at least a portion of data from the input data, such as a bar graph, a pie chart, a bubble layout, or a tree, for example. One or more of the genes may determine a system for aggregating portions of data from the input data, such as aggregating individual transaction data or time-stamped data into units of time, geographical units, product categories or other type categories, or some combination thereof, for example. Such multi-dimensional hierarchical organization or elements of it may already be indicated in the input data, but various genes may also indicate different levels on which to aggregate the data or different combinations of the dimensions with which to aggregate the data, in some examples.

Thus, the genes may identify or encode aspects of potential incremental changes to data visualization elements, including a descriptor defining a purpose of an action, a field of data, and a limited domain of applicable options. The genes may define an efficient underlying basis on which for genetic down-selection algorithms to be applied to score combinations of data visualization elements and their genes with respect to one or more applied fitness functions, such that only relatively high-scoring candidate data visualizations may be selected in each round of down-selection, thus evolving the population toward a very high-scoring data visualization with respect to the criteria defined in the fitness functions.

As shown in Table 1, genomic actions may include potential candidate changes to visualization type, coordinate system, orientation (e.g., horizontal or vertical), size, color, position, stack, layer, nesting, graph type, aggregations, and other options. The descriptor may be directed to an element type, a coordinate system, a data manipulation property, or a layout property, for example. The element type may include a bar, a line, a point, a polygon, a circle, or another geometric figure, for example. The coordinate system include properties selected from among horizontal, vertical, Euclidean, polar, geographic, clustered, stacked, polar, and three-dimensional (3D), for example, some of which may be non-exclusive. Various additional element properties may include paneling, axis labeling (e.g., shown, hidden, x only, y only), and legends (e.g., none, position left, position right, position upper right corner, position opposite origin of axis).

Thus, data visualization genomic system 22 may receive a set of input data, and generate digital genes that genomically define data visualization elements based on the input data, and that define potential incremental changes to the data visualization elements. Data visualization genomic system 22 may then execute a genetic selection process with respect to one or more fitness functions on populations of candidate data visualizations that are based on the genomically define data visualization elements. Data visualization genomic system 22 may then output a final data visualization output generated by the genetic selection process. Data visualization genomic system 22 may thus proliferate potential changes across a wide variety of meaningful data visualization properties, iteratively through a genetic selection process. Data visualization genomic system 22 may thus replace the need for trying to specify format decisions or business logic or encoding potentially large amounts of decision rules in an expert system for applying data visualizations for novel, non-routine, or unfamiliar datasets, in various examples.

Figure 4:
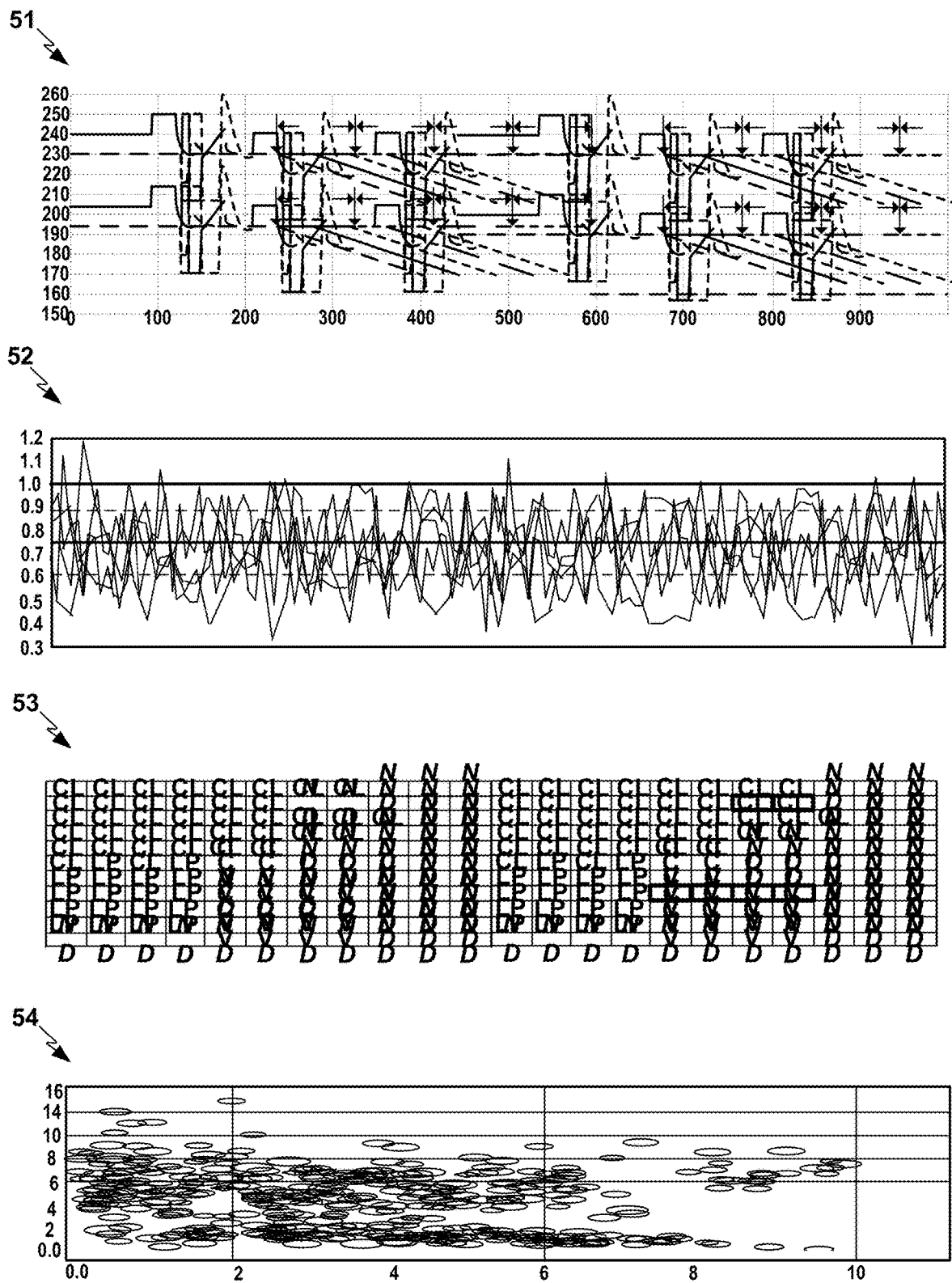
FIG. 4 shows various illustrative example representations of candidate data visualizations from among a potentially large number (e.g., billions) of candidate data visualizations, that a genetic population generation module may generate in one of a series of iterative generations in cooperation with a genetic population down-selection module, based initially on the genomically defined data visualization elements generated by a genomic definition module, and that all represent the input data in different ways, in one aspect of this disclosure.

FIG. 4 shows various illustrative example representations of candidate data visualizations 51, 52, 53, 54, from among a potentially large number (e.g., billions) of candidate data visualizations, that genetic population generation module 46 may generate in one of a series of iterative generations in cooperation with genetic population down-selection module 48, based initially on the genomically defined data visualization elements generated by genomic definition module 42, and that all represent the input data 31 in different ways, in one aspect of this disclosure. Candidate data visualizations 51, 52, 53, and 54 are arbitrary examples, and any of a wide variety of other candidate data visualizations are possible within the corresponding generation as processed by data visualization genomic system 22. Candidate data visualizations 51, 52, 53, and 54 may be defined by genes that encode the properties of and potential incremental changes to elements of individual candidate data visualizations among the potentially large population of candidate data visualizations. In a subsequent round of down-selection, genetic population down-selection module 48 may reject candidate data visualizations 51, 52, and 53 as not scoring highly enough with respect to the applied fitness functions, while selecting candidate data visualization 54 for inclusion in the down-selected population, for scoring sufficiently highly on the fitness functions. The applied fitness functions may, for example, define specific parameters representing criteria associated with desirable properties of a data visualization such as general ease of comprehension, ease of distinguishing relevant differences in the data along multiple relevant dimensions, and general aesthetic appeal, for example.

Figure 5:
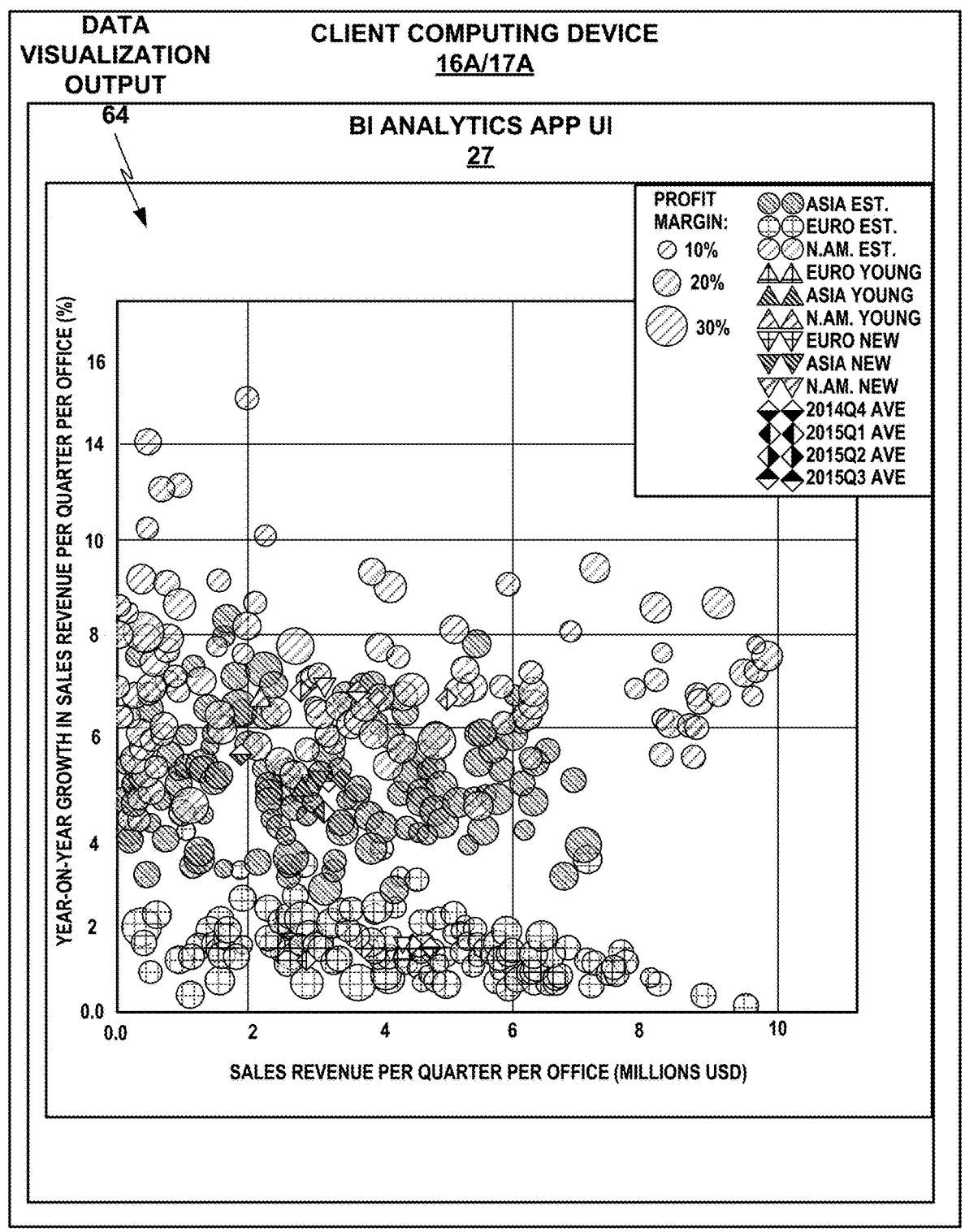
FIG. 5 shows a conceptual diagram of a client computing device displaying a screenshot of a BI analytics application user interface (UI) showing a final, evolved data visualization output resulting from a genomically defined genetic selection process performed by a data visualization genomic system, in one aspect of this disclosure.

FIG. 5 shows a conceptual diagram of a client computing device 16A/17A displaying a screenshot of a BI analytics application user interface (UI) 27 showing a final, evolved data visualization output 64 resulting from a genomically defined genetic selection process performed by data visualization genomic system 22, in one aspect of this disclosure. Data visualization output 64 may be substantially genetically descended from candidate data visualization 54 shown in FIG. 4, after additional modification by genomically defined candidate change actions to its elements, and with admixture of genes from other candidate data visualizations (and possibly genetic elements arising from random mutation), as described above. For example, data visualization output 64 may incorporate genomically defined change actions subsequent to its ancestral candidate data visualization 54 including a re-scaling of its y-axis, a change of shape of the representations of selected portions of the data to circles, different sizes of the circles to represent different aspects of the data, differentiated application of different colors (represented by different shadings in FIG. 5 due to the limitations of the black-and-white format of the figures) for the circles to represent selected aspects of the data, interspersed diamond shapes to represent certain averages of selected portions of the data, and addition of an informatively-populated legend placed in the upper right-hand corner of the data visualization where it does not obscure any of the data representation circles, in this example.

Data visualization output 64 may represent the highest-scoring candidate data visualization from the final generation of an evolutionary selection process carried out by data visualization genomic system 22 in which each generation achieved average scores with respect to the applied fitness functions that were higher than for the last generation, and which were iteratively down-selected to propagate only high-scoring candidate data visualizations. Data visualization output 64 may thus have scored very highly with respect to the applied fitness functions, which may have codified various desired criteria such as general ease of comprehension, ease of distinguishing relevant differences in the data along multiple relevant dimensions, and general aesthetic appeal, for example. Data visualization genomic system 22 may thus generate a data visualization output 64 that may convey a wealth of valuable information about a large complicated data set in a clear, intuitive, and aesthetically appealing manner.

In this particular example, data visualization graph 700 represents quarterly sales revenue per office, organized by region, along the x axis, and year-on-year sales growth per office along the y-axis. In particular, in this example, data visualization output 64 may depict quarterly sales revenue and profit margins for a large number of individual sales offices, categorized between Asian, European, and North American regions and between established, young, and new offices, and with various averages indicated, as referenced in the legend, in this illustrative example. Data visualization output 64 may thus enable a wealth of analysis on a large, complicated data set with a single, beautiful graph.

The example of FIG. 5 is just one arbitrary example of a great variety of possible data visualizations that may be generated by data visualization genomic system 22 and the processes described above. In some examples, data visualization genomic system 22 may also enable some degree of user interactivity in participating in the finalization of the end result data visualization, such as by presenting a small number of the highest-performing candidate data visualizations from the end result of the evolution process to choose from, or from enabling various (potentially small or limited, to avoid overwhelming a user) elements of choice of candidate data visualizations earlier in the process, such that user selections of small sample decisions in the evolution process are actually used as part of the fitness functions in evolving the candidate data visualizations.

Figure 6:
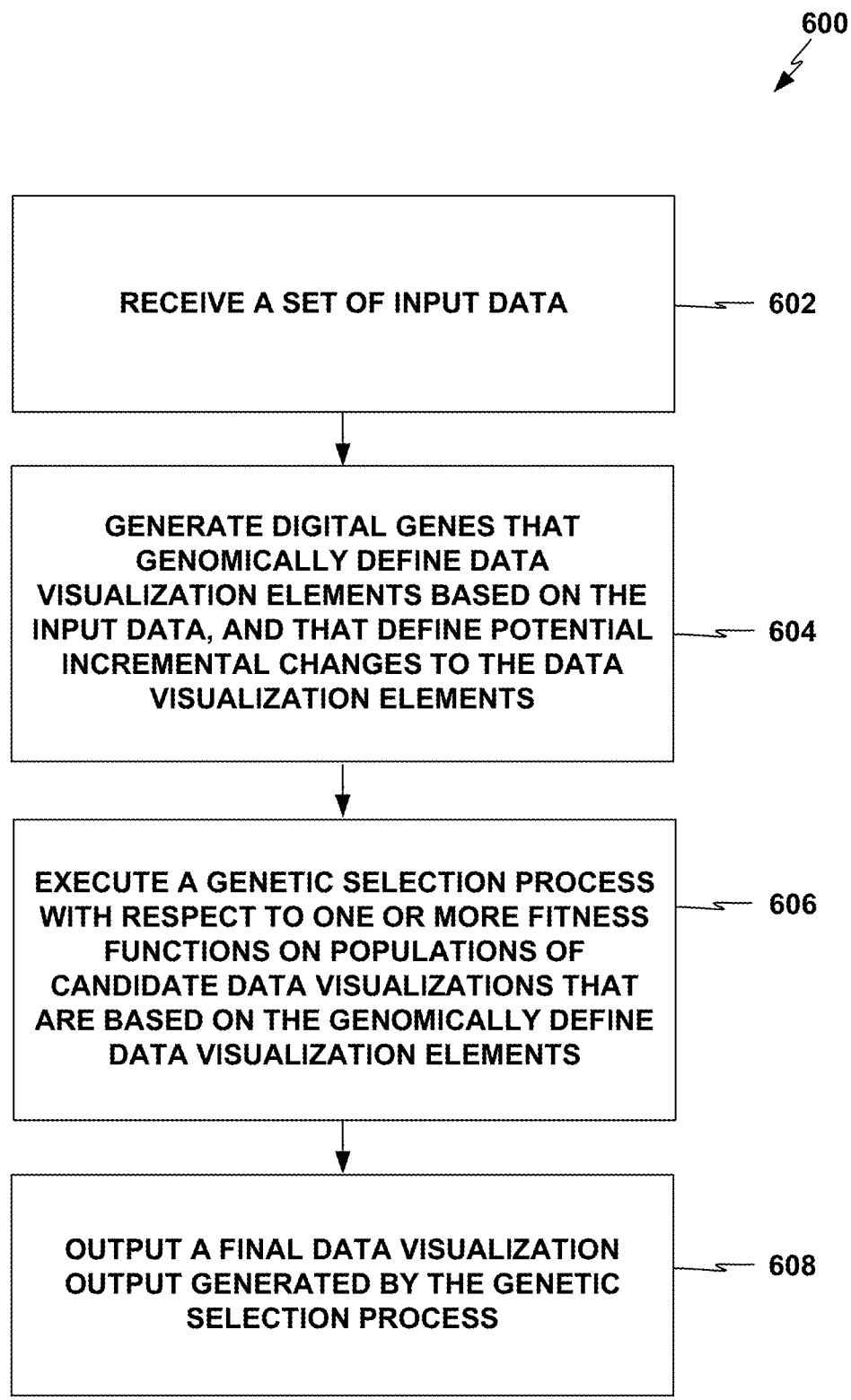
FIG. 6 depicts a flowchart of an example process that a data visualization genomic system, executing on one or more computing devices (e.g., servers, computers, processors, etc.), may perform, in one aspect of this disclosure.

FIG. 6 depicts a flowchart of an example process 600 that data visualization genomic system 22, executing on one or more computing devices (e.g., servers, computers, processors, etc.), may perform, in one aspect of this disclosure. Process 600 may include receiving a set of input data (602) (e.g., receiving input data set 31 from data stores 38 as described above). Process 600 may further include generating digital genes that genomically define data visualization elements based on the input data, and that define potential incremental changes to the data visualization elements (604) (e.g., genes defined by genomic definition module 42 that include one or more of descriptors, fields, and number indexes as described above). Process 600 may further include executing a genetic selection process with respect to one or more fitness functions on populations of candidate data visualizations that are based on the genomically define data visualization elements (606) (e.g., genetic population module 46 generating populations of candidate data visualizations (such as the illustrative example candidate data visualizations of FIG. 4) based on the genes as initially generated or subsequently based on a previously down-selected population, and genetic population module 46 iteratively providing those populations to genetic population down-selection module 48 to perform down-selection based on the fitness function criteria defined by fitness function module 44, as described above).

Process 600 may further include outputting a final data visualization output generated by the genetic selection process (608) (e.g., genetic population down-selection module 48 and/or data visualization finalizing module 49 of data visualization genomic system 22 finalizing the down-selection process, down-selecting to or otherwise selecting a single final data visualization from the final down-selected population, such as finalized genomic-system-generated data visualization output 64 of FIG. 5, in BI analytics application UI 27 in FIGS. 2 and 5 as described above).

Various implementations of process 600 may also include any of the processes described above with respect to FIGS. 1-5.

Figure 7:
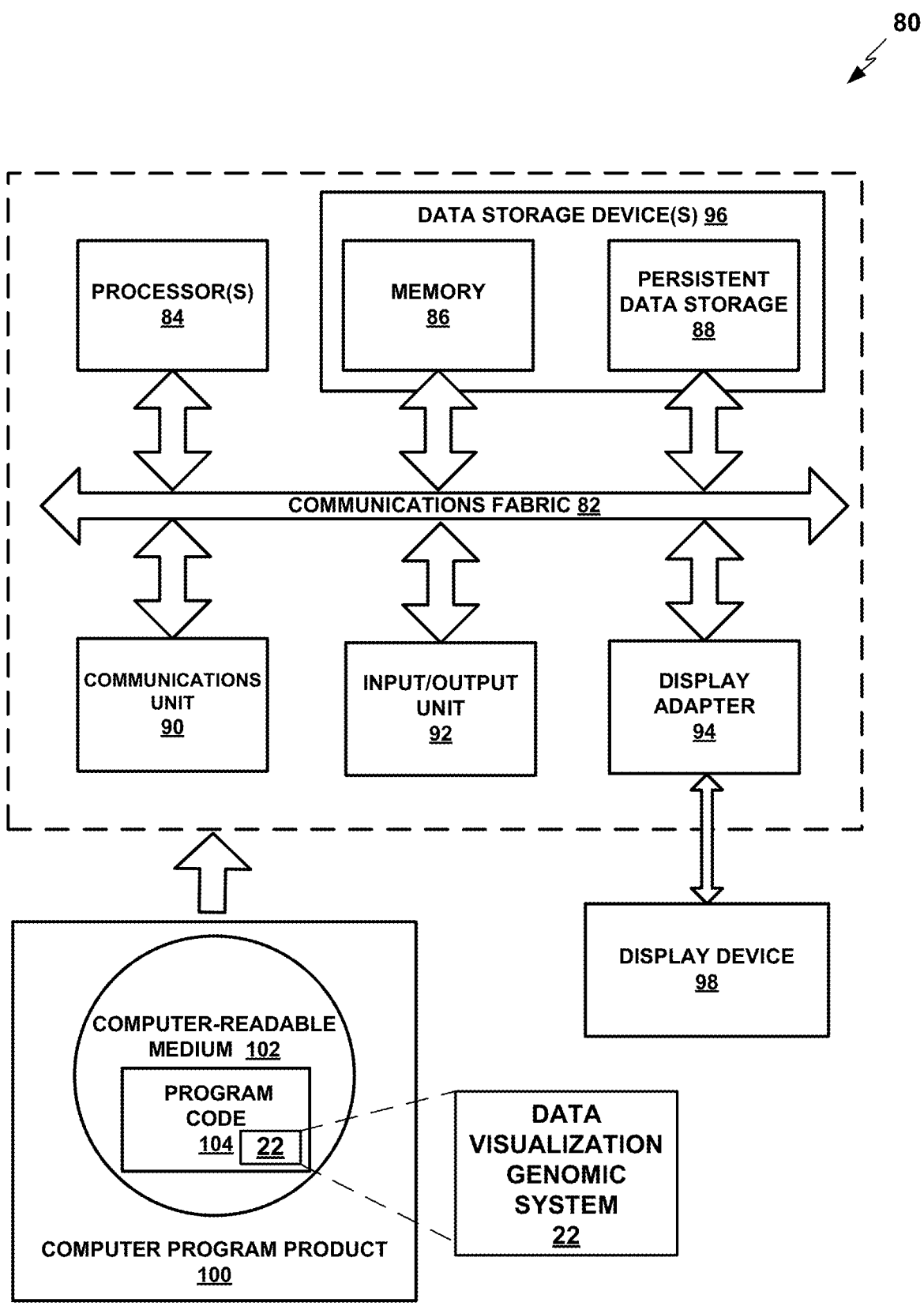
FIG. 7 is a block diagram of a computing device that may be used to execute a data visualization genomic system, in one aspect of this disclosure.

FIG. 7 is a block diagram of a computing device 80 that may be used to execute a data visualization genomic system 22, in one aspect of this disclosure. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 7, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a data visualization genomic system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer-readable storage medium having program code embodied therewith in a business intelligence system having a multi-tier architecture, each tier comprising one or more respective servers, the program code executable by a computing device to:
   receive, by an application tier of the multi-tier architecture comprising a data access service, a set of input data comprising one or more bodies of data from a database tier of the multi-tier architecture comprising database servers;
   generate, by the application tier of the multi-tier architecture further comprising enterprise applications, one or more digital chromosomes each comprising a collection of digital genes that genomically define data visualization elements based on the input data, wherein each digital gene of a respective digital chromosome defines an incremental change to at least one of the data visualization elements, and wherein each digital gene of the respective digital chromosome comprises a data field indicative of a first body of data from the one or more bodies of data of the input data to be added as an axis of a data visualization, the data field being associated with the defined incremental change;
   based on the data field, map, by the application tier of the multi-tier architecture comprising the enterprise applications, data from the first body of data included in the input data that is defined by the data field to one or more graphics properties in at least one of the data visualization elements genomically defined by the collection of digital genes;
   execute, by the application tier of the multi-tier architecture comprising the enterprise applications, a genetic selection process with respect to the one or more fitness functions on populations of candidate data visualizations that are based on the data visualization elements genomically defined by the digital genes of the respective digital chromosomes;

generate, by the application tier of the multi-tier architecture comprising the enterprise applications, based on execution of the genetic selection process with respect to the one or more fitness functions, a final data visualization from the populations of candidate data visualizations; and output, by a web tier of the multi-tier architecture comprising web server, the final data visualization generated by the genetic selection process.

2. The computer program product of claim 1, wherein one or more of the digital genes of a respective digital chromosome comprises a descriptor that describes a purpose of an action that causes the respective incremental change to the respective at least one of the data visualization elements.

3. The computer program product of claim 1, wherein one or more of the digital genes of a respective digital chromosome determines a type of data visualization element with which to represent a portion of data from the input data.

4. The computer program product of claim 1, wherein the program code is further executable by the computing device to execute the genetic selection process at least by iteratively generating the populations of candidate data visualizations and down-selecting from among the populations with respect to the one or more fitness functions, and wherein generating the populations of candidate data visualizations is based on combinations of the digital genes in the one or more digital chromosomes initially as generated and subsequently based on new combinations of digital genes from the down-selected populations.

5. The computer program product of claim 1, wherein one or more of the digital genes of a respective digital chromosome comprises a respective option index indicating one of a set of options associated with a particular type of variation in the respective incremental change to the respective at least one of the data visualization elements.

6. The computer program product of claim 1, wherein one or more of the digital genes of a respective digital chromosome determines a coordinate system with which to represent a portion of data from the input data.

7. The computer program product of claim 1, wherein one or more of the digital genes of a respective digital chromosome determines a shape with which to represent a portion of data from the input data.

8. The computer program product of claim 1, wherein one or more of the digital genes of a respective digital chromosome determines a color with which to represent a portion of data from the input data.

9. The computer program product of claim 1, wherein one or more of the digital genes of a respective digital chromosome determines a type of layout with which to represent at least a portion of data from the input data.

10. The computer program product of claim 1, wherein one or more of the digital genes of a respective digital chromosome determines a system for aggregating portions of data from the input data.

11. A computer system in a business intelligence system having a multi-tier architecture, each tier comprising one or more respective servers, comprising:

one or more processors, one or more computer-readable memories, and one or more computer-readable, tangible storage devices;

program instructions, stored on at least one of the one or more storage devices for execution by at least one of the one or more processors via at least one of the one or more memories, to receive, by an application tier of the multi-tier architecture comprising a data access service, a set of input data comprising one or more bodies of data from a database tier of the multi-tier architecture comprising database servers;

program instructions, stored on at least one of the one or more storage devices for execution by at least one of the one or more processors via at least one of the one or more memories, to generate, by the application tier of the multi-tier architecture further comprising enterprise applications, one or more digital chromosomes each comprising a collection of digital genes that genomically define data visualization elements based on the input data, wherein each digital gene of a respective digital chromosome defines an incremental change to at least one of the data visualization elements, and wherein each digital gene of the respective digital chromosome comprises a data field indicative of a first body of data from the one or more bodies of data of the input data to be added as an axis of a data visualization, the data field being associated with the defined incremental change;

program instructions, stored on at least one of the one or more storage devices for execution by at least one of the one or more processors via at least one of the one or more memories, to, based on the data field, map, by the application tier of the multi-tier architecture comprising the enterprise applications, data from the first body of data included in the input data that is defined by the data field to one or more graphics properties in at least one of the data visualization elements genomically defined by the collection of digital genes;

program instructions, stored on at least one of the one or more storage devices for execution by at least one of the one or more processors via at least one of the one or more memories, to execute, by the application tier of the multi-tier architecture comprising the enterprise applications, a genetic selection process with respect to the one or more fitness functions on populations of candidate data visualizations that are based on the data visualization elements genomically defined by the digital genes of the respective digital chromosomes;

program instructions, stored on at least one of the one or more storage devices for execution by at least one of the one or more processors via at least one of the one or more memories, to generate, by the application tier of the multi-tier architecture comprising the enterprise applications, based on execution of the genetic selection process with respect to the one or more fitness functions, a final data visualization from the populations of candidate data visualizations; and program instructions, stored on at least one of the one or more storage devices for execution by at least one of the one or more processors via at least one of the one or more memories, to output, by a web tier of the multi-tier architecture comprising web server, the final data visualization generated by the genetic selection process.

12. The computer system of claim 11, wherein one or more of the digital genes of a respective digital chromosome comprises a descriptor that describes a purpose of an action that causes the respective incremental change to the respective at least one of the data visualization elements.

13. The computer system of claim 11, wherein one or more of the digital genes of a respective digital chromosome determines a type of data visualization element with which to represent a portion of data from the input data.

14. The computer system of claim 11, wherein the program instructions to execute the genetic selection process comprise program instructions to iteratively generate the populations of candidate data visualizations and downselecting from among the populations with respect to the one or more fitness functions, and wherein generating the populations of candidate data visualizations is based on combinations of the digital genes in the one or more digital chromosomes initially as generated and subsequently based on new combinations of digital genes from the downselected populations.

15. The computer system of claim 11, wherein one or more of the digital genes of a respective digital chromosome comprises a respective option index indicating one of a set of options associated with a particular type of variation in the respective incremental change to the respective at least one of the data visualization elements.

16. The computer system of claim 11, wherein one or more of the digital genes of a respective digital chromosome determines a coordinate system with which to represent a portion of data from the input data.

17. The computer system of claim 11, wherein one or more of the digital genes of a respective digital chromosome determines a shape with which to represent a portion of data from the input data.

18. The computer system of claim 11, wherein one or more of the digital genes of a respective digital chromosome determines a color with which to represent a portion of data from the input data.

19. The computer system of claim 11, wherein one or more of the digital genes of a respective digital chromosome determines a type of layout with which to represent at least a portion of data from the input data.

20. The computer system of claim 11, wherein one or more of the digital genes of a respective digital chromosome determines a system for aggregating portions of data from the input data.

* * * * *